(12) United States Patent
Kokubo et al.

(10) Patent No.: US 7,448,865 B2
(45) Date of Patent: Nov. 11, 2008

(54) TRANSCRIPT APPARATUS

(75) Inventors: Mitsunori Kokubo, Numazu (JP);
Yukio Iimura, Suntou-gun (JP);
Masakazu Kanemoto, Gotenba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 199 days.

(21) Appl. No.: 11/404,799

(22) Filed: Apr. 17, 2006

(65) Prior Publication Data

US 2006/0233906 A1    Oct. 19, 2006

(30) Foreign Application Priority Data

Apr. 19, 2005    (JP)    ............................. 2005-121345

(51) Int. Cl.
*B29C 59/00* (2006.01)

(52) U.S. Cl. ..................... 425/385; 425/387.1; 425/388

(58) Field of Classification Search ................. 425/385, 425/387.1, 388
See application file for complete search history.

(56) References Cited

U.S. PATENT DOCUMENTS

| | | | |
|---|---|---|---|
| 3,828,842 A | 8/1974 | Tagnon | |
| 4,316,712 A | 2/1982 | Medendorp | |
| 4,878,826 A | 11/1989 | Wendt | |
| 4,907,956 A | 3/1990 | Ezaki et al. | |
| 4,969,812 A | 11/1990 | Brown | |
| 5,496,433 A * | 3/1996 | Miyashita et al. | 156/358 |
| 6,364,648 B1 | 4/2002 | Bishop et al. | |
| 6,416,311 B1 | 7/2002 | Springer et al. | |
| 6,699,425 B1 | 3/2004 | Reuther et al. | |
| 6,808,443 B2 | 10/2004 | Halley | |
| 7,070,405 B2 | 7/2006 | Sreenivasan et al. | |
| 7,140,861 B2 | 11/2006 | Watts et al. | |

(Continued)

FOREIGN PATENT DOCUMENTS

DE    10 2006 018 139 A1    3/2007

(Continued)

OTHER PUBLICATIONS

Stephen Y. Chou et al., "Nanoimprint Lithography", J. Vac. Sci. Technol. B, vol. 14, No. 6, pp. 4129-4133 (1996).

(Continued)

*Primary Examiner*—Yogendra Gupta
*Assistant Examiner*—Maria Veronica D Ewald
(74) *Attorney, Agent, or Firm*—DLA Piper US LLP

(57) ABSTRACT

A transcript apparatus has a base frame 7 supported on one end of a body frame 3, a support frame 5 supported on the other of the body frame 3, plural die bars 9 through which the frame 7 and the frame 5 are integrally connected, a movable body 19 placed between the guide frames 3B, 3B located on both sides of the body frame 3 and freely movable along the die bars 9, guide means 21 disposed on the guide frames 3B, 3B on both sides to guide the movable body 19 to a position symmetric to a center of the movable body 19, and drive means mounted on the frame 5 for moving the movable body 19 along the guide means, wherein a given pattern is transcribed from a transcription die 41 mounted on the movable body 19 to a forming product 13 placed on the frame 7.

3 Claims, 4 Drawing Sheets

U.S. PATENT DOCUMENTS

| | | | |
|---|---|---|---|
| 7,150,622 B2 * | 12/2006 | Choi et al. | 425/385 |
| 7,204,686 B2 | 4/2007 | Chung et al. | |
| 2004/0200368 A1 | 10/2004 | Ogino et al. | |
| 2005/0089597 A1 * | 4/2005 | Ito | 425/388 |
| 2006/0037406 A1 | 2/2006 | Dharia | |
| 2006/0193938 A1 * | 8/2006 | Iimura et al. | 425/385 |
| 2006/0233906 A1 | 10/2006 | Kobubo et al. | |
| 2006/0257514 A1 | 11/2006 | Kokubo et al. | |

FOREIGN PATENT DOCUMENTS

| | | |
|---|---|---|
| JP | 2004-034300 | 2/2004 |
| JP | 2004-288784 | 10/2004 |
| JP | 2004-358857 | 12/2004 |

OTHER PUBLICATIONS

Office Action in U.S. Appl. No. 11/415,1310, mailed Feb. 4, 2008.
German Office Action issued on Aug. 3, 2007, in related Application No. 10 2006 021 507.9.
English translation of German Office Action issued on Aug. 3, 2007, in related Application No. 10 2006 021 507.9.
Non-Final Office Action; U.S. Appl. No. 11/439,291 mailed Jan. 10, 2008.
Taiwanese IPO Search Report issued in Application No. 095114106 mailed Jan. 31, 2008.
English Translation of Taiwanese IPO Search Report issued in Application No. 095114106 mailed Jan. 31, 2008.
B.J. Choi et al., "Design of orientation stages for step and flash imprint lithography", Precision Engineering Journal of the International Societies for Precision Engineering and Nanotechnology, 25, (2001) pp. 192-199.
English language abstract of TW 368465.
English language abstract of TW 476700, published Feb. 21, 2002.
English language abstract of TW 458882, published Oct. 11, 2001.
English language abstract of TW 200413159.
Notice of Allowance issued in copending related U.S. Appl. No. 11/439,291, mailed Jul. 30, 2008.
Notice of Allowance issued in U.S. Appl. No. 11/415,130 mailed Aug. 12, 2008.

* cited by examiner

TRANSCRIPT APPARATUS

BACKGROUND OF THE INVENTION

The present invention relates to transcript apparatuses wherein a finely engraved pattern formed on a surface of a die is transcribed onto a surface of a forming product using lithographic technology and, more particularly, to a transcript apparatus that can minimize positional displacement (lateral displacement) between a die and a forming product.

Transcript apparatuses of this kind need to maintain mutually facing contact surfaces of a die and a forming product in a strictly parallel alignment, and to minimize mutual positional displacement between the die and the forming product during die-pressing process and die-removing process.

A transcript apparatus disclosed in Japanese Patent Application Laid-open No. 2004-34300 is comprised of: an L-shaped frame 101 including a lower horizontal section 101A and a vertical section 101B; an XY stage 102 mounted on the lower horizontal section 101A; a support section 103 mounted on the XY stage 102; a moving mechanism 104 located on the vertical section 101B of the frame 101 to be vertically movable; and a die support section 105 supported on the vertical section 101B by means of the moving mechanism 104.

The forming product support section 103 is comprised of a support member (forming product support member) 106 and a magnetic body 107 mounted on the support member 106. The magnetic body 107 allows a forming product 108 to be set thereonto. The die support section 105 is comprised of a support member 109, vertically movable by the moving mechanism 104 and a magnet 111 mounted on a lower surface of the support member 109 by means of a resilient member 110. The magnet 111 permits the die 112 to be set onto a lower surface thereof.

With such a transcript apparatus, the resilient member 110 absorbs deviations from parallel alignment between a surface of the die 112 and a surface of the forming product 108, while a magnetic attraction force generated between the magnet 111 and the magnetic body 107 can avoid positional displacement between the support member 109, by which the die 112 is supported, and the support member 106, by which the forming product 108 is supported. Here the positional displacement means lateral displacement caused by relative movement in a (horizontal) direction perpendicular to a pressing direction.

SUMMARY OF THE INVENTION

The transcript apparatus, however, has issues as follows: When the die 112 is pressed against the forming product 108 by the magnetic attraction force generated between the magnet 111 and the magnetic body 107, if the die 112 is subject to excessively strong pressing force, its reaction force arises for causing an upper area of the vertical section 101B of the frame 101 slightly warps leftward as viewed in FIG. 1. Consequently, the reaction force slightly misaligns the die 112 and the forming product 108 (that is, minute positional displacement). Such positional displacement also occurs when the frame 10 is deformed due to temperature variations.

The present invention has been completed with the above issues in mind and has an object to provide a transcript apparatus that can minimize minute positional displacement (lateral displacement) caused by a pressing force, temperature variations, and others.

A main aspect of the present invention provides A transcript apparatus comprising: a body frame; a base frame located on one end of the body frame; a support frame placed in opposition to the base frame and fixedly connected to the body frame by a plurality of die bars; a pair of guide frames provided on left and right sides of the body frame and forming a part of the body frame; a movable body placed on the guide frames and freely movable along the die bars between the base frame and the support frame; guide means disposed on the pair of guide frames so as to guide the movable body along the die bars to a position symmetric to a center of the movable body; and drive means mounted on one of the support frame and the base frame for moving the movable body along the guide means, wherein one of the support frame and the base frame carries one of a transcription die and a forming product, to which a pattern is transcribed from the transcription die, and the movable body carries the other one of the transcription die and the forming product in a position opposite to the one of the transcription die and the forming product carried by the one of the support frame and the base frame.

DETAILED DESCRIPTION OF THE PREFERRED EMBODIMENTS

Figure 1:
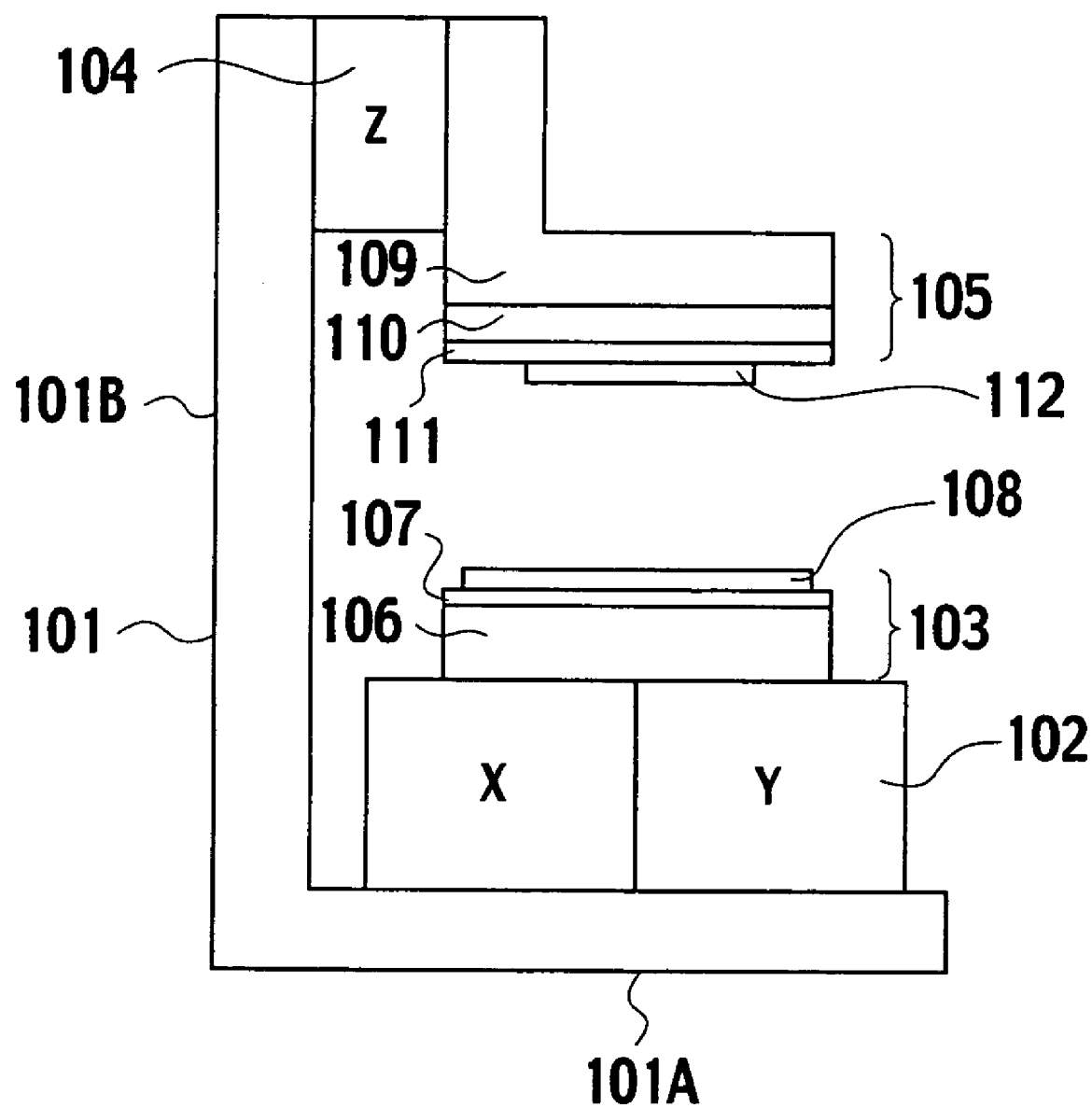
FIG. 1 is an illustrative view showing a structure of a transcript apparatus of the related art.
Figure 2:
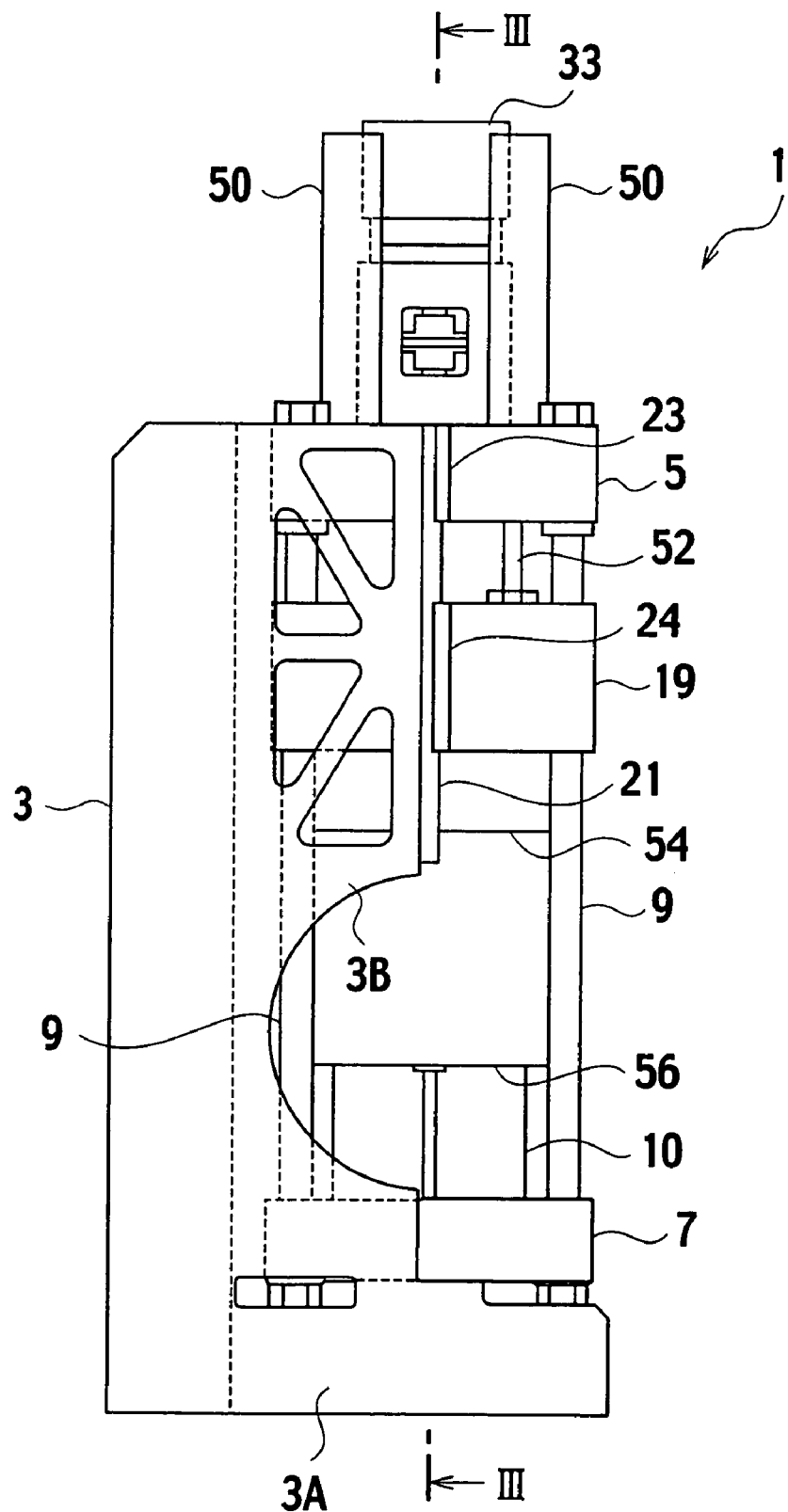
FIG. 2 is a left side view showing one embodiment of a transcript apparatus according to the present invention.
Figure 3:
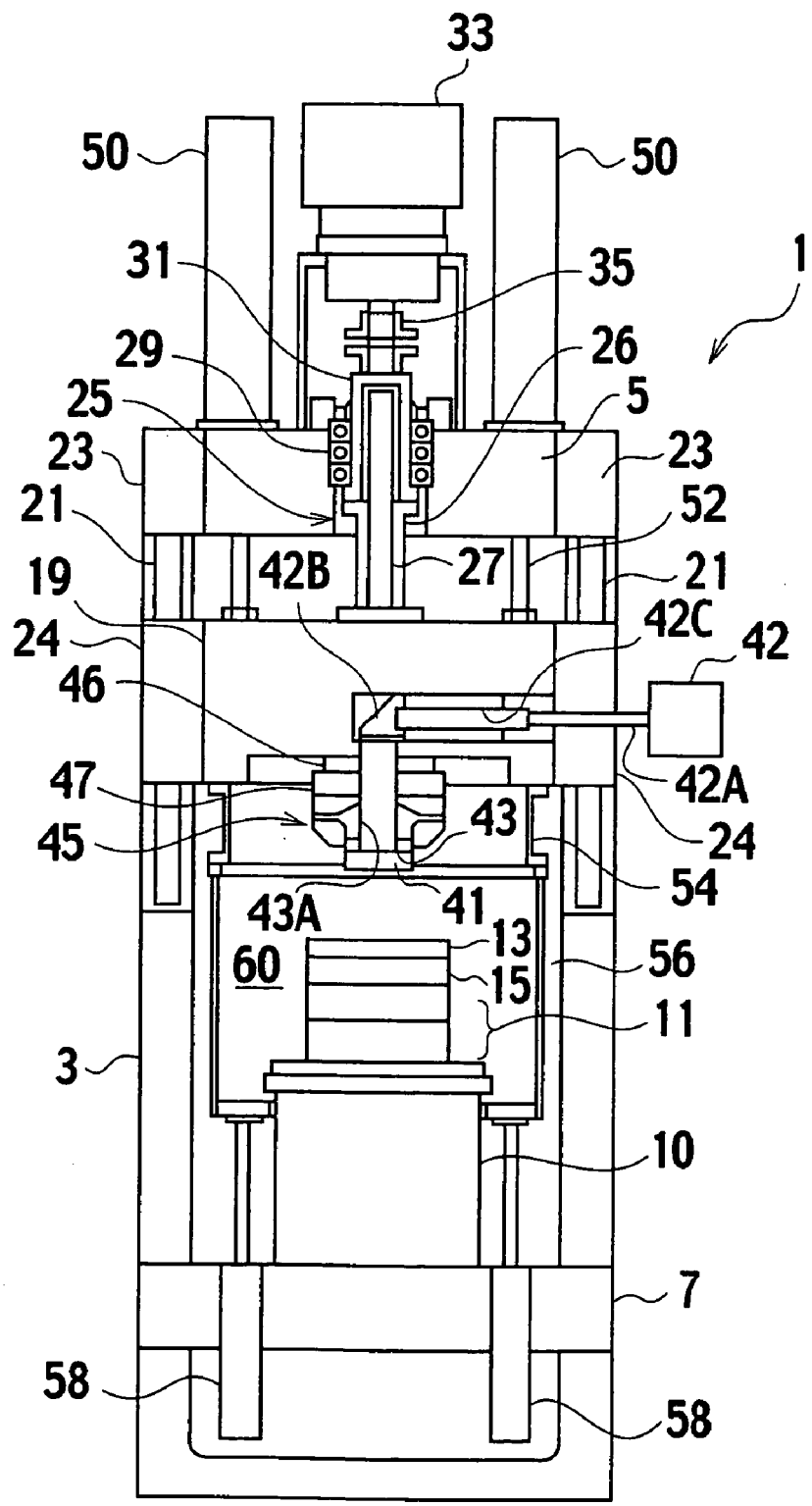
FIG. 3 is a cross sectional view taken along line III-III of FIG. 2.

As shown in FIGS. 2 and 3, a transcript apparatus 1 of one embodiment according to the present invention includes: a body frame 3 having a generally L-shaped side shape; a square-shaped lower frame (base frame) 7 integrally mounted on a lower side of; a frame support section 3A by which the lower frame 7 is supported; die bars 9 standing upright from four corners of the lower frame 7 in parallel to a vertical section of the body frame 3; a square-shaped upper frame (support frame) 5 located on upper ends of the die bars 9 for supporting a drive means; and a square-shaped movable body 19 supported on the die bars 9 to be movable in a direction along the die bars 9 (vertical direction) in a space between the upper frame 5 and the lower frame 7.

The body frame 3 has an upper area formed with a pair of guide frames 3B, 3B. The pair of guide frames 3B, 3B protrudes forward (rightward in FIG. 2) such that their end faces reach positions substantially half of left and right side faces of the upper frame 5 and the movable body 19. In addition, the pair of guide frames 3B, 3B has distal ends provided with vertically extended linear guides (guide means) 21. The upper frame 5 and the movable frame 19 have left and right side surfaces carrying on sliders 23, 23 and sliders 24, 24, respectively. The sliders 23, 23 and the sliders 24, 24 engage the linear guides 21, 21 and are movably guided in a vertical direction with high precision under, for instance, zero clearance.

In summary, the body frame 3 has one end side (a lower side) provided with the frame support section 3A by which the lower frame (base frame) 7 is supported, thereby providing a generally L-shaped configuration from a side view. The other end side (on an upper side) of the body frame 3 has left and right sides (a vertical direction in FIG. 4) provided with the guide frames 3B, 3B, respectively having the linear guides 21, 21, which protrude forward, thereby providing a structure wherein the upper end side is formed with a concave portion.

Figure 4:
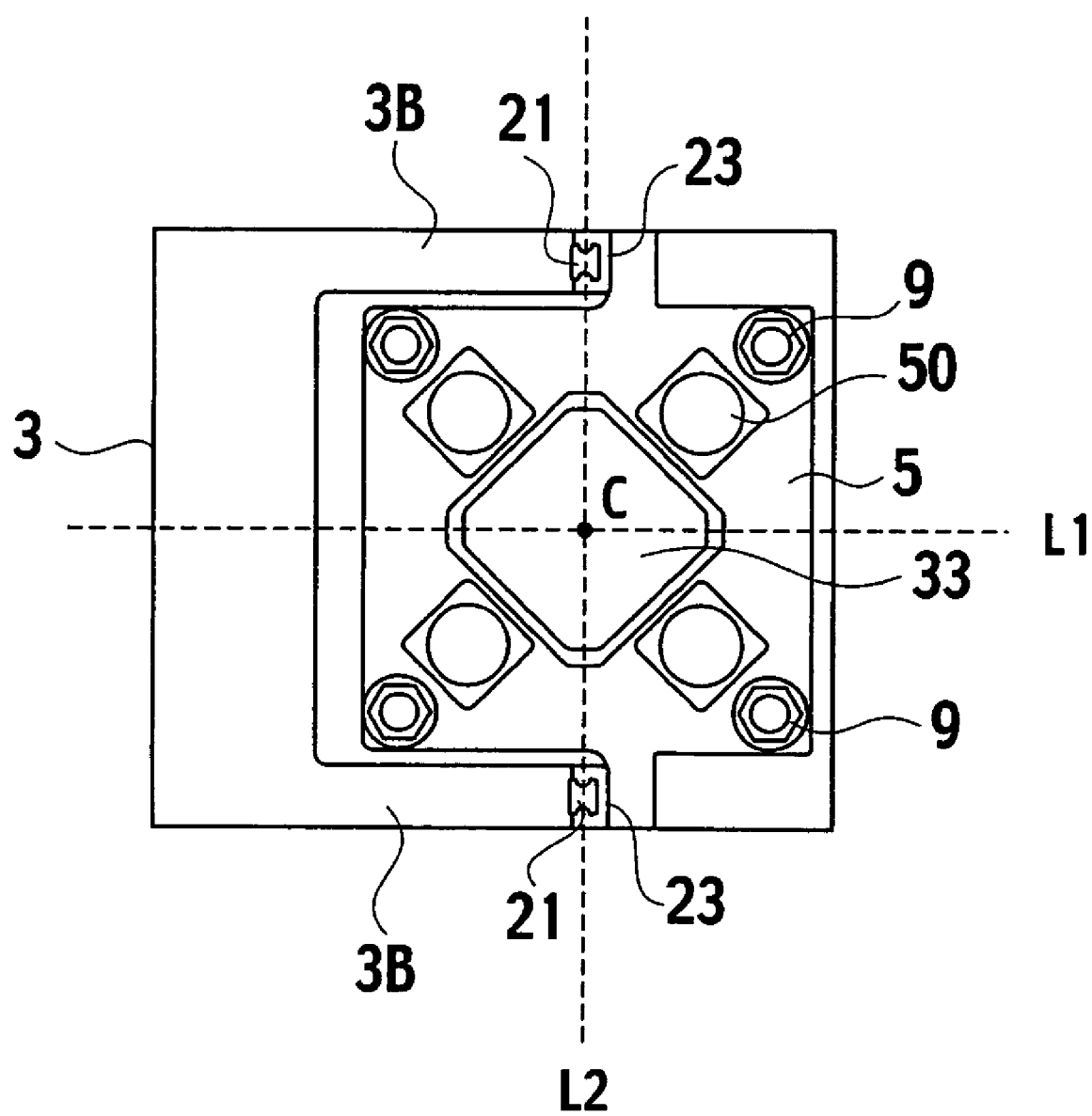
FIG. 4 is a plan view of the transcript apparatus shown in FIG. 2.

Moreover, as shown if FIG. 4, the upper frame 5 and the movable body 19 are disposed between the left and right guide frames 3B, 3B of the body frame 3. Engagement portions between the sliders 23, 23 and the sliders 24, 24, those which are respectively provided on the upper frame 5 and the movable body 19, and the linear guides 21, 21 are located at positions symmetric to a center line L1 passing across the intersection C between the center line L1 extended in a back and forth direction of the movable body 19 (a lateral direction in FIG. 4) and a center line L2 extended in a horizontal direction (the vertical direction in FIG. 4).

Also, while the linear guides 21, 21 in FIG. 2 are provided in common to the sliders 23, 23 and the sliders 24, 24, respectively, an alternative may be possible such that linear guides are separately provided for the sliders 23, 23 and the sliders 24, 24, respectively. However, when considered in ease of machining and machining precision on a mutually parallel alignment, the linear guides 21, 21 may be preferably provided in common to the sliders 23, 23 and the sliders 24, 24.

In order to avoid positional displacement (lateral displacement) between the upper frame 5 and the movable body 19 caused by temperature variations of them, the linear guides 21, 21 and the sliders 23, 23, and the sliders 24, 24 may be preferably located at positions symmetric to the center line L1 passing across the intersection C between the center line L1 extended in the back and forth direction of the upper frame 5 and the movable body 19 and the center line L2 extending along the horizontal direction.

The lower frame 7 has an upper surface with a central area carrying on a stationary bed 10 that is vertically extended upward. As shown in FIG. 3, the stationary bed 10 carries on movable tables 11, including X- and Y-tables, which can be moved in X- and Y-directions (lateral and vertical directions) and can be positioned upon fine adjustments. The movable tables 11 carry on a support head 15 on which a forming product is supported. Also, the movable tables 11 are guided by the linear guides and the sliders and driven by a servomotor, but the detailed description is omitted because of its well-known structure.

The forming product 13 is comprised of a thin film that a forming layer made of ultraviolet curing resin is applied on an upper surface of a substrate made of suitable material such as silicone, glass, or ceramics. The forming layer has a thickness in the order of several tens nanometers to several micrometers. Since such a forming layer may possibly employ resist made of thermoplastic resin, the support head 15 may incorporate a heating means (not shown) such as a heater to thermally soften the forming layer to provide ease of the forming.

As shown in FIG. 3, the movable body 19 has a lower central area (a center of a surface opposite to the lower frame 7) carrying on a turntable 47 by means of a load cell 46. The turntable 47 can be turned about a center of the lower central area of the movable body 19 and fixedly secured at a given angular position. A die support plate 43 is mounted on the turntable 47 by means of a gimbal mechanism 45 and detachably carries a die 41.

The gimbal mechanism 45 takes a structure wherein a spherical surface, centered at a central area of a die surface (a lower surface in FIG. 3) of the die 41, plays a role as a guide surface available to freely tilt the die 41 about the center of the die surface, and the guide surface is air stuck to enable an attitude of the die 41 to be fixed in an unmoved status.

The die 41 has the die surface on which a finely engraved pattern is formed by a lithographic technology. The die 41 is made of transparent quartz glass that is easy to transmit ultraviolet rays in the present embodiment.

All of the die support plate 43, the gimbal mechanism 45, the turntable 47, and the load cell 46 have central areas through which through-bores 43A is extended. The movable body 19 has a through-bore (light guide path) 42C which guides ultraviolet rays, emitted from an ultraviolet light source 42, from the through-bores 43A to a backside of the die 41 via an optical fiber 42A and a reflection mirror 42B.

The upper frame 5 as the support plate carries on a servomotor 33 as an example of a drive means to move the movable body 19. The servomotor 33 has an output shaft 35 coupled to a hollow shaft 31. The hollow shaft 31 is mounted on the upper frame 5 via a bearing 29 only for rotatable movement. The hollow shaft 31 has a lower end to which a ball screw nut 26 forming a ball screw mechanism 25 is fixedly mounted. The ball screw nut 26 engages a ball screw shaft 27 that is fixedly mounted onto the movable body 19 in perpendicular direction at a center of the movable table 19 for moving the movable body 19 up and down with a given speed and torque.

As shown in FIG. 3, a plurality of balance cylinders 50 as an example of a balance taking means are amounted on the upper frame 5 at positions symmetric to the center of the movable body 19. The plurality of balance cylinders 50 have piston rods 52 connected to the movable body 19, respectively, to cancel load of the movable body 19 acting downward due to gravity.

Mounted on the lower surface of the movable body 19 is a ring-shaped upper cover 54 by which the die support plate 43 is surrounded. On the contrary, mounted on the lower frame 7 is a ring-shaped lower cover 56 so as to surround the movable table 11. The ring shaped lower cover 5 has a lower end which engages a periphery of the stationary bed 10 for moving capability and an upper end which is formed to bring into abutting engagement with a lower end of the upper cover 54. The lower cover 56 is moved up and down by a plurality of cylinders 58 as an example of a vertical motion actuator. The plurality of cylinders 58 is mounted to the lower frame 7. The upper cover 54 and the lower cover 56 defines an openable and closable forming chamber 60 around the die support plate 43 and the movable table 11.

Next, the operation of the transcript apparatus is described.

The cylinders 58 as the vertical motion actuator are actuated to move the lower cover 56 downward, thereby opening the forming chamber 60. The die 41 is mounted onto the die support plate 43 and the turntable 7 finely adjusts a mount (rotation) angle (die orientation) of the die 41 in a horizontal direction about the center of the die 41. In addition, the mount angle adjustment for the die 41 may be automatically conducted with each forming product 13 set on the support head 15 by a well-known positioning means with the use of a marking.

After the die 41 is set in such a manner, the forming product 13, whose upper surface is coated with the forming layer made of ultraviolet curing resin, is set to the support head 15.

Subsequently, the cylinders 58 are actuated to lift the lower cover 56, thereby closing the forming chamber 60. The servomotor 33 is then actuated with torque set to a relatively low value to move the movable body 19 downward. This causes the die 41 to come closer to the forming product 13 such that the die 41 is pressed against an upper surface of the forming product 13 by a relatively small pressing force.

When this takes place, the linear guides 21, 21, ones that are disposed both sides in the upper area of the body frame 3, and the sliders 24, 24, ones that are held in engagement with the linear guides 21, 21, enable the movable body 19 to be moved downward with minimal positional displacement (lateral displacement) of the movable body 19 in a direction intersecting a movable direction of the movable body 19. Thus, the die 14 can be brought into pressing engagement with the forming product 13 in a direction toward a given position. At this time, the balance cylinders 50 cancel load of the movable body 19 acting downward due to the gravity, and consequently, the servomotor 33 enables the movable body 19 to move downward with a precisely controlled speed and torque.

When the die 41 is pressed against the forming product 13, even if abutting surfaces (contact surfaces) of them are out of parallel alignment, the die 41 is supported with the gimbal mechanism 45 for tilting capability. Therefore a whole surface of the die 14 can be pressed against the upper surface of the forming product 13 with a uniform surface pressure. Then, since the gimbal mechanism 45 allows the die 41 to be tilted about the center of the central area of the die surface along the spherical surface centered at the central area of the die surface (lower surface in FIG. 3) of the die 41, the positional displacement of the die 14 in a lateral direction (horizontal direction) is not occurred.

The pressing force is detected by the load cell 46, and the detected signal is fed back to the servomotor 33 to keep the pressing force at a given value. Even at this time, since the balance cylinders 50 can cancel the load of the movable body 19, the servomotor 33 is enabled to precisely perform torque control.

When the pressing step using a relatively small pressing force is completed in such a way, the air bearing of the gimbal mechanism 45 is reduced to be negative pressure to fixedly secure the attitude of the die 41 in an unmoved state and subsequently the servomotor 33 increases torque. Such an increase in torque causes the die 41 to be strongly pressed against the forming layer made of ultraviolet curing resin coated over the upper surface of the forming product 13. Consequently, the finely engraved pattern formed over the surface of the die 41 is transcribed onto the forming layer of the forming product 13.

Then the strong pressing force of the die 41 makes the die bars 9 slightly extended and the upper frame 5 displaced upward. However, since the linear guides 21, 21 and the sliders 23, 23 absorb such displacement of the upper frame 5, an upper portion of the body frame 3 to warp leftward as viewed in FIG. 2. This minimizes the positional displacement (lateral displacement) of the die 41 in a direction perpendicular to the moving direction of the die 41 that would be caused by the pressing of the die 41.

Further, even if the plural die bars 9 stretch in different with each other, the structure of the upper frame 5 supported by the linear guides 21, 21 and the sliders 23, 23 enables the positional displacement (lateral displacement) of the upper frame 5 to be minimized. Consequently, the positional displacement (lateral displacement) of the die 41 can be reduced to a minimal extent.

Moreover, since there exists an extremely slight difference in the extensions of the die bars 9 if the pressing force of the die 41 is relatively small, the guide means including the linear guides 21, 21 and the sliders 23, 23 for the upper frame 5 may be omitted.

After the transcription step is completed, ultraviolet rays emitted from the ultraviolet light source 42 to a backside of the die 41 through the light guide path, which is composed of the optical fiber 42A and the reflection mirror 42B, for a given time interval. Since the die 41 is made of transparent quarts glass, ultraviolet rays radiated to the backside of the die 41 pass through the die 41 and are then radiated to the forming layer, which is made of ultraviolet curing resin and coated over the upper surface of the forming product 13. Consequently, the forming layer is hardened.

After the forming layer is hardened in such a way, the servomotor 33 is driven to lift the movable body 19 to remove the die 41 away from the forming product 13 while keeping the die 41 in a fixed attitude. Subsequently, the cylinders 58 are actuated to move the lower cover 56 downward for opening the forming chamber 60, and after the forming product 13 is taken out, and the transcription operation is completed.

The present invention is not limited to the present embodiment and various alterations may be suitably implemented in other embodiments. For instance, while in the present embodiment the movable body 19 located on the upper frame 5 is provided with vertical movability to the stationary bed 10 mounted on the lower frame 7, the vertical movability of the movable body 19 is relative to that of the stationary bed 10 (that is, the vertical movability of the die 41 is relative to that of the forming product 13), and therefore consequently, an alternative structure may be allowable such that the stationary bed 10 is rendered vertically movable and the movable body 19 is made stationary. Further, while in the present embodiment the die 41 is mounted on the movable body 19 and the forming product 13 is mounted on the lower frame 7, these may be mounted in an opposite way. Additionally, the structure shown in FIGS. 2 and 3 may be arranged in an upside down configuration or may be arranged in laid down configuration. That is, while the present embodiment has been exemplarily described with reference to a vertical type structure, the present invention may also be implemented in a vertical structure with component parts arranged in an upside down configuration or in a transverse configuration. Furthermore, various structures may be adopted including those in which the servomotor 33 is mounted on the lower frame 7 and the die 41 and the forming product 13 are disposed between the upper frame 5 and the movable body 19.

Further, for the forming layer, either one of materials such as ultraviolet ray curing resin, thermoplastic resin or any other materials may be employed and related softening and/or hardening means may be selectively used depending on materials of the forming layer. In addition, the gimbal mechanism 45 may be located in an area closer to the forming product 13. Moreover, when setting the die 41 to the lower frame 7, the gimbal mechanism 45 may be mounted on the lower frame 7. Also, depending on situations, the gimbal mechanism 45 may be omitted.

In such a way, according to the present invention, since the die bars receive the pressing force of the die acting on the forming product with no affect on the body frame, the body frame is not deformed. Also, since the guide means supports the movable body 19 in a position symmetric to the center thereof, even if the body frame is deformed due to temperature variations, the positional displacement (lateral displacement) of the movable body can be reduced to a minimal extent. This results in capability of minimizing the positional displacement (lateral displacement) between the die and the forming product caused by the pressing force and temperature variations.

The entire content of Japanese Patent Application No. P2005-121345 with a filing data of Apr. 19, 2005 of which is expressly incorporated herein by reference in its entirety.

What is claimed is:
1. A transcript apparatus comprising:
   a body frame;
   a base frame located on one end of the body frame;
   a support frame placed in opposition to the base frame and fixedly connected to the body frame by a plurality of die bars;

a pair of guide frames provided on left and right sides of the body frame and forming a part of the body frame;

a movable body placed on the guide frames and freely movable along the die bars between the base frame and the support frame;

guide means disposed on the pair of guide frames so as to guide the movable body along the die bars to a position symmetric to a center of the movable body; and drive means mounted on one of the support frame and the base frame for moving the movable body along the guide means, wherein one of the support frame and the base frame carries one of a transcription die and a forming product to which a pattern is transcribed from the transcription die, and the movable body carries the other one of the transcription die and the forming product in a position opposite to the one of the transcription die and the forming product carried by the one of the support frame and the base frame, and wherein the support frame is rendered movable to the body frame, and the guide means is configured to guide the movable body along the die bars to a position symmetric to a center of support frame.

2. The transcript apparatus according to claim 1, wherein the drive means includes a ball screw mechanism disposed between the support frame and the movable body, and a servomotor for driving the ball screw mechanism.

3. The transcript apparatus according to claim 1, further comprising balance means for canceling a weight of the movable body rendered movable in a vertical direction.

* * * * *